United States Patent
Korobov et al.

(10) Patent No.: US 11,477,290 B1
(45) Date of Patent: Oct. 18, 2022

(54) REMOTE SESSION STATE BACKUP AND RESTORATION

(71) Applicant: PARALLELS INTERNATIONAL GmbH, Schaffhausen (CH)

(72) Inventors: Ivan Korobov, Moscow (RU); Maksim Shulga, Moscow (RU)

(73) Assignee: Parallels International GmBH, Schaffhausen (CH)

( * ) Notice: Subject to any disclaimer, the term of this patent is extended or adjusted under 35 U.S.C. 154(b) by 0 days.

(21) Appl. No.: 17/135,038

(22) Filed: Dec. 28, 2020

(51) Int. Cl.
*H04L 67/141* (2022.01)
*H04L 41/0803* (2022.01)
*G06F 9/455* (2018.01)
*G06F 9/451* (2018.01)

(52) U.S. Cl.
CPC .......... *H04L 67/141* (2013.01); *G06F 9/452* (2018.02); *G06F 9/45558* (2013.01); *H04L 41/0803* (2013.01); *G06F 2009/45595* (2013.01)

(58) Field of Classification Search
CPC ... H04L 67/141; H04L 41/0803; G06F 9/452; G06F 9/45558; G06F 2009/45595
See application file for complete search history.

(56) References Cited

U.S. PATENT DOCUMENTS

| | | | | |
|---|---|---|---|---|
| 6,128,621 A * | 10/2000 | Weisz | ................... | G06F 16/258 |
| 7,536,672 B1 * | 5/2009 | Ruehle | .................. | G06F 9/4493 717/101 |
| 10,063,660 B1 * | 8/2018 | Coldham | ............... | H04J 3/0667 |
| 10,621,175 B2 * | 4/2020 | Dev | ....................... | G06F 16/252 |
| 10,645,174 B2 * | 5/2020 | Crisan | ................... | H04L 67/141 |
| 10,649,864 B1 * | 5/2020 | Parikh | ................. | G06F 11/1471 |
| 2006/0218563 A1 * | 9/2006 | Grinstein | ................... | G06F 8/20 719/328 |
| 2012/0188263 A1 * | 7/2012 | Becchi | .................. | G06F 12/109 345/543 |
| 2013/0138791 A1 * | 5/2013 | Thomas | ................ | H04L 67/148 709/223 |
| 2014/0082511 A1 * | 3/2014 | Weissberg | ............... | G06F 9/452 715/740 |

(Continued)

OTHER PUBLICATIONS

Ibrahim et al., "Virtual Desktop Infrastructures: Architecture, survey and green aspects proof of concept", 2016 Seventh International Green and Sustainable Computing (GSC), Nov. 7, 2016.*

*Primary Examiner* — Todd L Barker
(74) *Attorney, Agent, or Firm* — Rosenberg, Klein & Lee

(57) ABSTRACT

Virtual machines provide users with an ability to work with applications or whole desktops on remote system through a remote session or sessions. However, when a remote system hibernates/shuts down the remote session disconnects and subsequently the remote system may log off (close) the session in order to free system resources for other active sessions for other users. Accordingly, the session state is lost and when the user reconnects to the remote system a new session is created, and new instances of applications started in it. It would be beneficial to provide users with the features of the client device upon the remote system such that the remote system captures a current session state of a user's virtual session allowing it to be stored and then allows for subsequent restoration of the session upon the same remote system or another remote system which can access the stored virtual session state.

14 Claims, 5 Drawing Sheets

(56) References Cited

U.S. PATENT DOCUMENTS

| | | | |
|---|---|---|---|
| 2017/0046235 A1* | 2/2017 | Straub | G06F 8/35 |
| 2018/0007059 A1* | 1/2018 | Innes | H04L 9/3228 |
| 2019/0250800 A1* | 8/2019 | Coldham | G06T 13/80 |
| 2019/0361718 A1* | 11/2019 | Wei | G06F 9/452 |
| 2019/0391809 A1* | 12/2019 | Leidal | G06F 9/5027 |
| 2022/0050708 A1* | 2/2022 | Douglas | G10L 15/1822 |

\* cited by examiner

REMOTE SESSION STATE BACKUP AND RESTORATION

FIELD OF THE INVENTION

This patent application relates to virtual sessions and more particularly to capturing a current session state of a user's virtual session upon a remote system and subsequent restoration of the session upon the same remote system or another remote system.

BACKGROUND OF THE INVENTION

Virtual machines provide users with an ability to work with a discrete application, multiple applications, or whole desktops where these applications, desktops etc. are hosted on a remote system and provided through a remote session or sessions. These users may also, either discretely or concurrently, employ local applications on a local device (commonly referred to as a client device). Accordingly, from the user's perspective it is important for remote applications to behave as close to the local applications as possible to provide users with a seamless experience when they work within a mixed environment, i.e. one with remote applications and local applications.

Operating systems on client devices are capable to suspending and resuming a user's session, i.e. store the local session when the electronic device goes to sleep, shuts down, or the user logs off from the local computer session, and restore the session back when the computer resumes/starts again or user logs in next time, so that the does not need to reopen all the applications they were working upon before again, reload documents, web pages, etc. However, this does not apply to the applications which are being hosted remotely so that when the remote system hibernates/shuts down the remote session disconnects. Further, after a certain period of time (commonly referred to as a timeout) the remote system may log off (close) the session in order to free system resources for other active sessions for other users. Once the session is terminated, its state is lost, so when a user reconnects to the remote system after that timeout, a new session is created, and new instances of remote applications are started in it.

Accordingly, it would be beneficial to provide users with the features of the client device upon the remote system such that the remote system captures a current session state of a user's virtual session allowing it to be stored and then allows for subsequent restoration of the session upon the same remote system or another remote system which can access the stored virtual session state.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to virtual sessions and more particularly to capturing a current session state of a user's virtual session upon a remote system and subsequent restoration of the session upon the same remote system or another remote system.

In accordance with an embodiment of the invention there is provided a method comprising:

establishing a remote session upon a remote system;
establishing a session management agent upon a computer system in association with the remote session;
acquiring remote session data relating to actions of a user with the remote session;
converting the remote session data, with the session management agent, to session state description objects;
storing the session state description objects within a memory accessible to the session management agent as a remote session configuration.

In accordance with an embodiment of the invention there are provided one or more non-transitory computer-readable media having instructions stored thereon that, when executed by a system, cause the system to:

establish a remote session upon a remote system;
establish a session management agent upon a computer system in association with the remote session;
acquire remote session data relating to actions of a user with the remote session;
convert the remote session data, with the session management agent, to session state description objects;
store the session state description objects within a memory accessible to the session management agent as a remote session configuration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
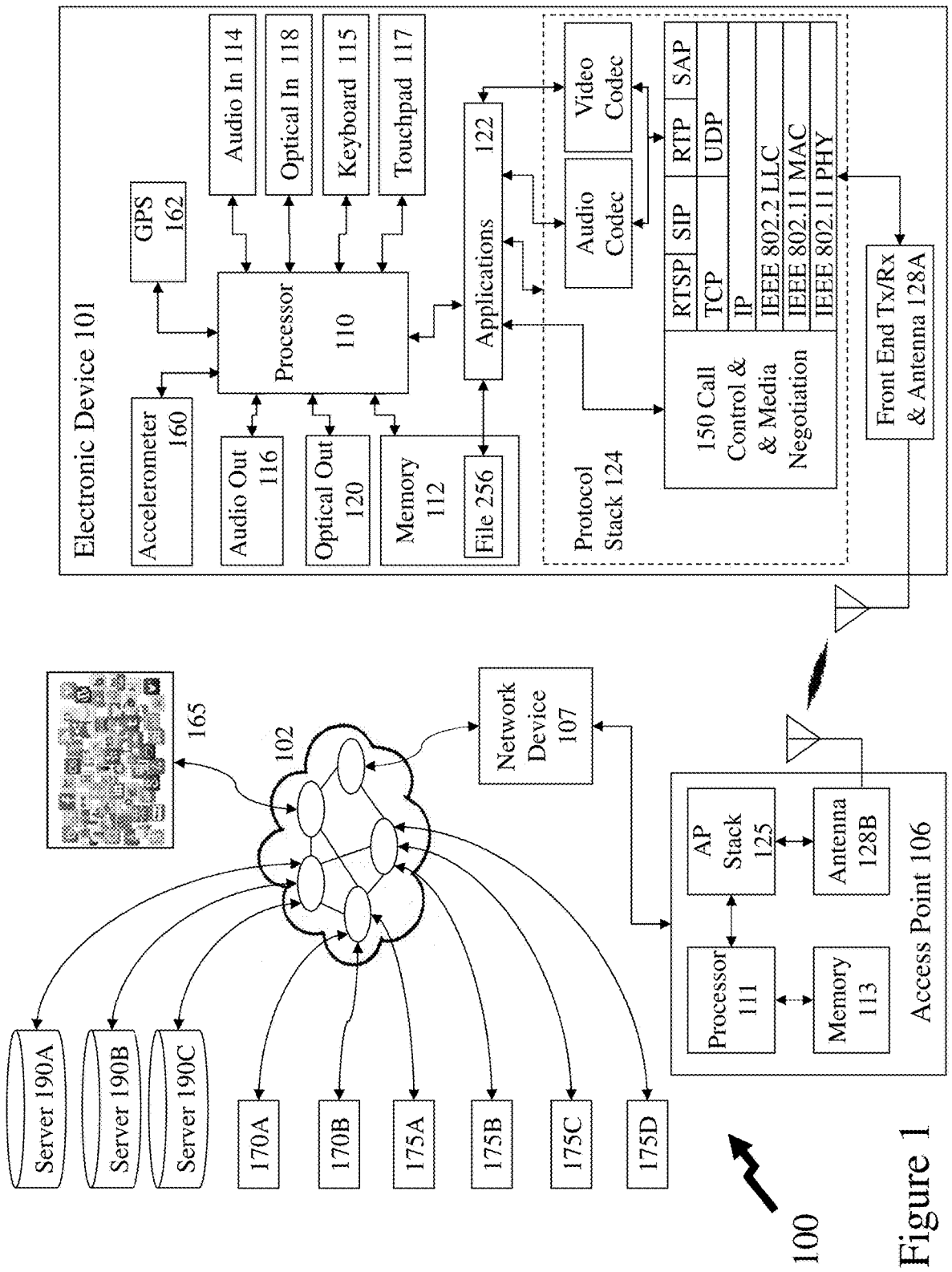
FIG. 1 depicts an exemplary electronic device and network supporting embodiments of the invention.

The present description is directed to virtual sessions and more particularly to capturing a current session state of a user's virtual session upon a remote system and subsequent restoration of the session upon the same remote system or another remote system.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can access directly a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited, to a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real world boundary, e.g. state line, country etc., or generated boundary such as a school zone, neighborhood, etc. A geofence may be defined also by an electronic device's ability to access one or more other electronic devices, e.g. beacons, wireless antennas etc.

An "artificial intelligence system" (referred to hereafter as artificial intelligence, AI) as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "barcode" as used herein may refer to, but is not limited to, a method of representing data in a visual, machine-readable form. A barcode may represent data by varying the widths and spacings of parallel lines such as within linear or one-dimensional (1D) or using rectangles, dots, hexagons, and other geometric patterns, called matrix codes or two-dimensional (2D) barcodes. A barcode may comply with a standard or be application specific in order to represent the encoded alphanumeric data.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Figure 2:
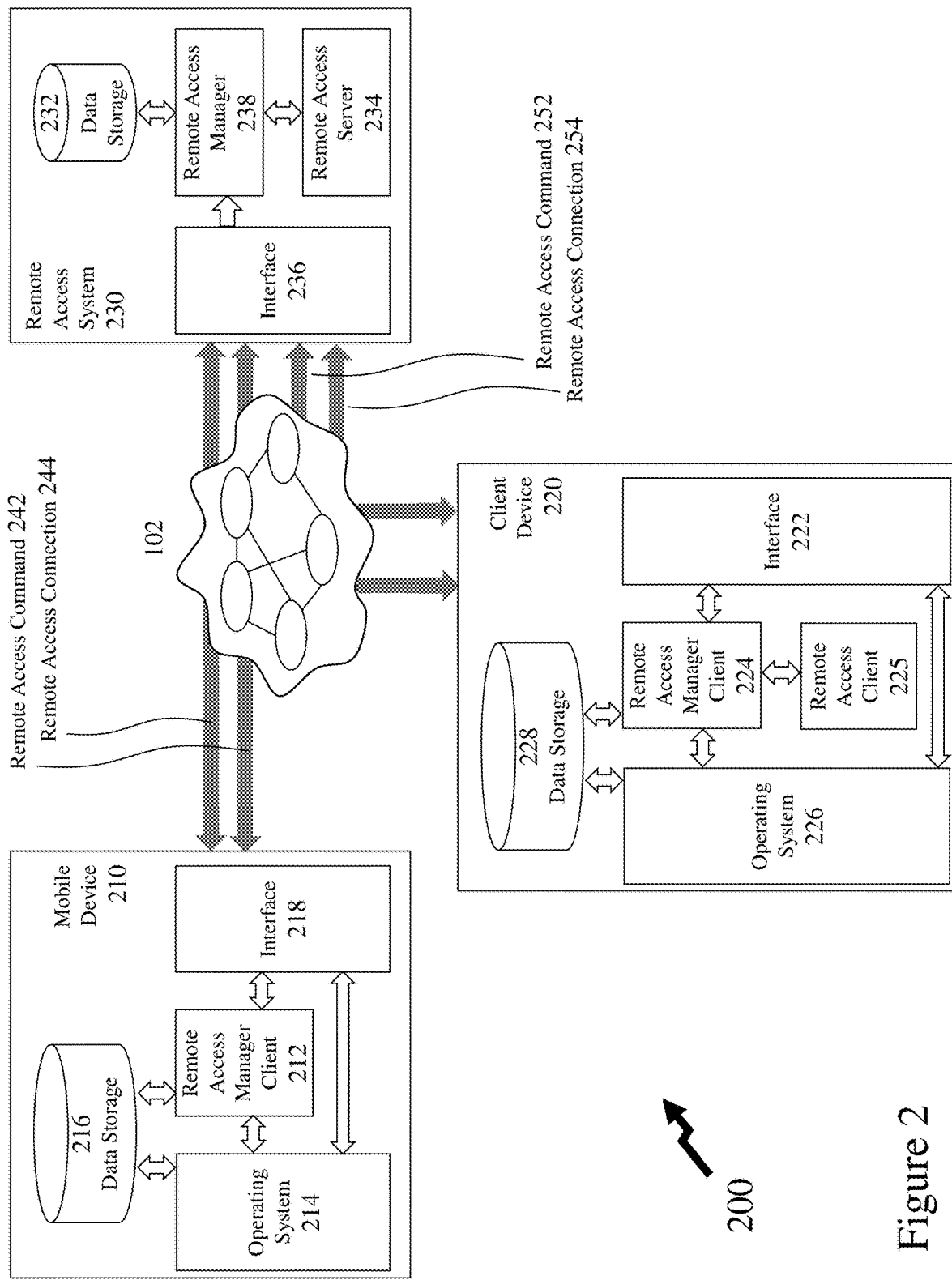
FIG. 2 depicts an exemplary block diagram of a system for initiating or transferring a remote access session between a mobile client and/or a client device and a remote access system supporting embodiments of the invention.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figures 3A, 3B:
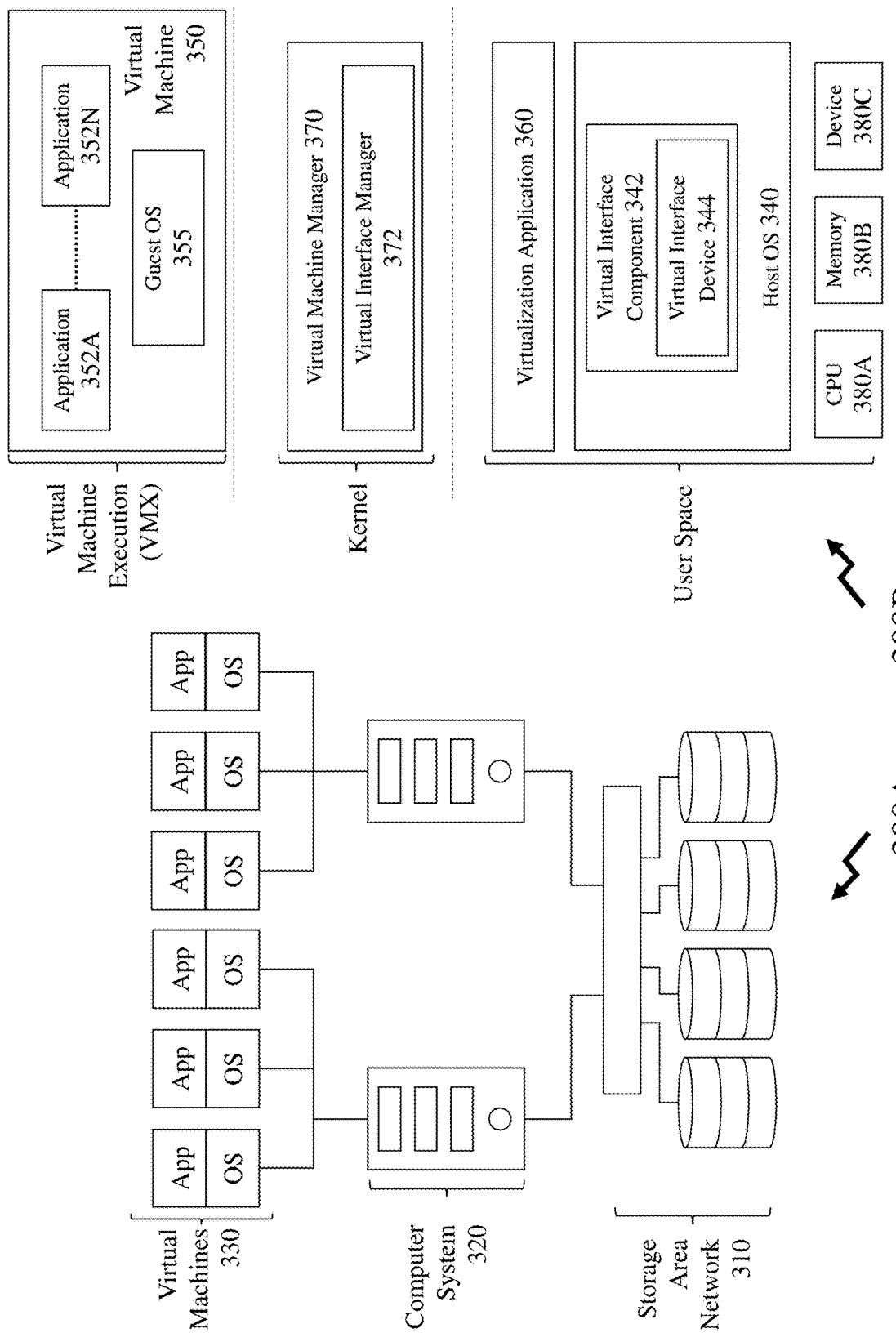
FIG. 3A depicts schematically an architecture of virtual machines as instantiated by remote access sessions supporting embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g. Access Point 106) and therein to the Network 102 via Network Device 107 or through a network access point directly to the Network 102.

A remote access session may be possible only within a predetermined geofence, e.g. a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g. their residence or set it to some default inaccessible geofence (e.g. one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g. a Mobile Device 210 without a GPS may establish a personal area network connection to another device, e.g. a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a user name, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g. a fingerprint, facial scanner, or credential data of the user from a card scanner and/or reader device (e.g. as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g. Mobile Device 210 or Client Device 220. This information provided to the Remote Access System 230 may also include information that identifies the scanner/device as well as time and/or date of the information being acquired and/or geographic location information of the scanner/device location, Such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Referring to FIG. 3A there is depicted a schematic architecture 300A supporting embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The WM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as WM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g. Mobile Device 210 or Client Device 220.

As noted above virtual machines provide users with an ability to work with a discrete application, multiple applications, or whole desktops where these applications, desktops etc. are hosted on a remote system and provided through a remote session or sessions. Virtual machines remove the necessity for users, employers, enterprises and organizations to install and maintain their work environment and allows the use of any device (e.g. a fixed electronic device and/or portable electronic device) to access the applications in a remote session. In many instances, the users may also employ locally installed applications at the same time as well. Accordingly, from the user's perspective it is important for remote applications to behave as close to the local applications as possible to provide users with a seamless experience when they work within a mixed environment, i.e. one with remote applications and local applications.

Operating systems on client devices are capable to suspending and resuming a user's session, i.e. store the local session when the electronic device goes to sleep, shuts down, or the user logs off from the local computer session, and restore the session back when the computer resumes/ starts again or user logs in next time, so that the does not need to reopen all the applications they were working upon before again, reload documents, web pages, etc. However, this does not apply to the applications which are being hosted remotely so that when the remote system hibernates/ shuts down the remote session disconnects. Further, after a certain period of time (commonly referred to as a timeout) the remote system may log off (close) the session in order to free system resources for other active sessions for other users. Once the session is terminated, its state is lost, so when a user reconnects to the remote system after that timeout, a new session is created, and new instances of remote applications are started in it.

Accordingly, it would be beneficial to provide users with the features of the client device upon the remote system such that the remote system captures a current session state of a user's virtual session allowing it to be stored and then allows for subsequent restoration of the session upon the same remote system or another remote system which can access the stored virtual session state.

Accordingly, within the scenario described above when the remote system closes the remote session the previous session state (i.e. which applications were running and what content has been loaded in them, which windows were on the screen and their layout, etc.) is lost. This requires the user to reestablish their work environment (i.e. reload documents, web pages, re-layout windows, etc.) manually. This therefore breaks the seamless experience when the user works in a mixed environment with local and remote applications.

Within another scenario the ability to provide a user with the ability to capture the remote session state and restore it according to embodiments of the invention allows for a remote session state to be suspended and resumed within a distributed system, which includes a number of remote servers where remote applications are hosted, but the exact server which would host a remote session, is calculated dynamically when a user connects to a central gateway, taking into account current servers' load, network conditions between user's device and the remote server, etc. Accordingly, the remote server resuming the remote session may not be the same as the remote server which suspends and captures the remote session state.

For example, with mobile users, they may start to work at one location, so one server is selected to serve a remote session for them, but then move to another location, where another server would be more suitable to host the remote session to provide improved user experience. However, if the session state has not been preserved, reconnection to another server would force the user to restore their remote work environment manually. Within the prior art this remote session capture/reinstatement is not implemented as the remote session to which the user connects is maintained upon the initial remote server allowing the user to reconnect to a session which is already running.

However, if the remote session is inaccessible to the user when seeking to reconnect, for example the remote server fails, the remote server is shutdown, the remote server shuts down the remote session to free resources, or the remote server is disconnected from the network, the user is forced to manually re-establish their remote work environment. However, even when the remote session is still executing when the user reconnects this may lead to non-optimal remote session performance for the user. For example, the network connection between user's device and remote server from a second location could be considerably than from their initial, first, location such as if these locations are geographically different, the remote server is now loaded with other remote sessions taking substantial resources and/or having higher priority etc. Accordingly, with embodiments of the invention the remote server serving the reinstated remote session may be established to provide improved performance (user experience).

It would also be evident that the ability to suspend/reinstate remote sessions with a transfer from one remote system to another remote system (i.e. remote session preservation and migration) would also be beneficial to providers of remote systems as it would allow a remote server to be removed for urgent server maintenance, for example, wherein the current user sessions would be migrated to other remote servers, with a less disruptive this process for users, rather than hoping, for example, that all pending remote sessions are closed by users before the remote server fails.

It would also be evident that it is known for an application itself to preserve and resume user activities on the same or different devices. However, this functionality requires that the application be designed to support this functionality from the very beginning and implement specific application programming interfaces (APIs) which to save and resume the state of the application. Accordingly, it would be evident that applications without this functionality, particularly legacy applications, are not able to utilize state preservation, so users have to reopen and reload content into them manually. Accordingly, embodiments of the invention address this to provide an experience which is less seamless for a user working in a distributed environment with a mix of locally installed and remotely served applications, with and without native support for application state preservation and resumption.

In order to capture a user's remote session state and restore it at a later stage, either upon the same remote server, the same remote system, another remote server, or another remote system, a formalization description of the state of the remote session should be established. Within embodiments of the invention the format of the formalization description may be suitable for both the preservation of the state of the remote session on a remote system, which may be a memory accessible to both the original remote server and/or another remote server reinstating the remote session. For example, this memory may be part of a remote system or a local device to the user (e.g. a client device or the user's mobile device for example) wherein the formalization description of the remote session is employed in the subsequent restoration of the remote session. This restoration being managed, for example, by a session management agent associated with one or more of a client device, a user's mobile device, and a remote system (e.g. the original remote system or another remote system).

From a user's perspective, a remote session consists of one or more applications (hereinafter referred to as a set of applications) the user works with, which, in turn, are associated with a set of windows within a graphical user interface or graphical user interfaces rendered to the user each presenting application-specific content within the set of applications. This application-specific content may, for example, include but not be limited to documents, web pages, electronic messages, presentations, spreadsheets, drawings, computer aided design(s), simulations, and audio-visual content. This application specific content can be represented as a set of resources (e.g. the files) opened in each application of the set of applications and a presentation context. A presentation context may include, for example, but not be limited to a current page and scroll position within a document, a position within audiovisual content, and one or more current settings of the application.

Accordingly, a session state may be represented by, but may not be limited to:
A list of resources associated with the session state, e.g. memory usage, central processor loading, graphical processor loading;
A list of running applications wherein each running application is associated with a window of a plurality of windows; and
A "z-order" of the plurality of windows defining the sequence of the plurality of windows so that upon restoration the windows are sequenced in the same manner such that the window at the front when the session state is saved is at the front upon restoration etc.

A state of each application of the plurality of applications may be represented by, but not limited to:
Unique application identity, for example a hashed full application path on the remote system;
A list of resources loaded by the application, e.g. filename; and
A status of the application as a pop-up may be active, a drop-down menu active, etc.

A state of each resource may be represented by, but may not be limited to:
A uniform resource information (URI) such as filename, file storage location, web uniform resource location (URL) of the resource;
Resource presentation parameters such as page number, scroll position, time position in audiovisual content etc.

A state of each window of the plurality of windows may be represented by, but not limited to:
A window identifier;
A window title;
A set of dimensions for each window of a plurality of windows, each window associated with a running application of a plurality of windows;
A geometry of each window of the plurality of windows (as whilst windows are typically rectangular (or square) they are not geometrically limited to such a requirement, see for example, circular palette windows for example within graphics applications); and
A set of coordinates for each window of the plurality of windows, each set of coordinates defining a position within a graphical user interface rendered to the user associated with the remote session.

It would be evident that as user works within a remote session the session state changes over time, e.g. which applications are opened/closed, the application content changes, windows are moved or resized, etc. Accordingly, in order to keep the session state information current, a session management agent monitors and updates the state of the remote session as it changes. Within embodiments of the invention this session management agent installs hooks and event filters via a standard platform API allowing execution of specific code (referred to as callbacks) when a particular event happens, e.g. a new application starts, a window opens, content is accessed, content changed, etc. This session management agent may be associated with the remote server providing the remote session, with the remote system of which the remote server providing the remote session, with a network interface of the remote system providing the remote session, with the client device, etc. Where the session management agent is associated with the client device this may be installed and executed upon the client device when the remote session is initiated or it may be installed when software is installed upon the client device which supports the establishment of remote sessions, for example. Accordingly, as soon as a parameter, included into session state description, changes, this session state information is updated by the session management agent.

The session management agent may, for example, maintain the current session state on a client device, so it updates its stored session state description object(s), wherein the user can reinstate the remote session using the stored session state description object(s).

The session management agent may, for example, maintain the current session state on a device associated with the user, so it updates its stored session state description object(s), wherein the user can reinstate the remote session using the stored session state description object(s) upon either the same client device or another client device based upon the device associated with the user being associated with the same client device or another client device.

The session management agent may, for example, maintain the current session state on a device associated with the user, so it updates its stored session state description object(s), wherein the user can reinstate the remote session using the stored session state description object(s) upon either the same client device or another client device based upon the device communicating with the remote server or remote system which is to reinstate the remote session.

The session management agent may, for example, maintain the current session state on a memory device, so it updates its stored session state description object(s), wherein the user can reinstate the remote session using the stored session state description object(s) by establishing a new session from the same client device as that associated with the remote session whose stated is stored by the stored session state description object(s).

The session management agent may, for example, maintain the current session state on a memory device, so it updates its stored session state description object(s), wherein the user can reinstate the remote session using the stored session state description object(s) by establishing a new session from another client device to that originally associated with the remote session whose stated is stored by the stored session state description object(s) based upon the user's credentials which are entered when the user opens a new remote session.

Optionally, the session management agent may store data relating to multiple stored session state description object or session state description object sets where each stored session state description object or session state description object set is associated with a different remote session.

Optionally, when a user logs in to establish a remote session then the session management agent may present the user with a list of stored sessions allowing the user to open one of a set of stored sessions. Accordingly, for example, a user may establish a first remote session for work and another remote session for home wherein upon logging in to a new remote session they may establish this session as either work or home and exploit the stored session state description object(s) for that selected session. It would be evident that this may be extended as a user, may for example, have different remote sessions for different activities due to their different resource requirements, e.g. one for computer aided design (CAD) or computer aided modelling (CAM), another for office applications, and another for graphical design.

Accordingly, the session management agent may establish the state of a remote session whether it closes unexpectedly or closes in a planned manner by the user. Such an unexpected closure may be triggered at the client device, the remote system or by an aspect of the network connecting the remote system and client device.

Within embodiments of the invention when a user's client application connects or re-connects to a remote session host and a new session is created for the user, the stored session state description object is employed to establish the reinstated remote session.

Within embodiments of the invention the reinstatement may be automatic such that the session management agent transmits the session state description object set(s) to the remote system upon detecting the user establishing the new remote session.

Within embodiments of the invention the reinstatement may be automatic such that the a session management agent transmits the session state description object set(s) to the remote system upon the session management agent being polled by the remote system when the user establishes the new remote session. The session management agent being polled, for example, with identity information of the user establishing the remote session, the identity of the client device the remote session is being initiated from, and an identity of the previous remote session.

It would be evident that a user may have multiple concurrent remote sessions active each of which is tracked and stored and that these may be recovered concurrently or individually within embodiments of the invention.

Optionally, each remote session may be associated with a different session management agent where the remote sessions are upon different remote servers and/or remote systems where the session management agent(s) are remote to the client device.

Optionally, each remote session may be associated with a common session management application where the session management agent is on the client device.

Optionally, each remote session may be associated with a common session management application where the session management agent is on a device associated with the user which is associated with the client device.

Within embodiments of the invention the session management agent parses the information provided in the session state description object(s) and uses it to restore the session environment, so for each application in the session state description object it starts that application, restores its content (e.g. opens resources stored in the resource list), restores opened resource context (e.g. by navigating to a stored page or scrolling a canvas etc.), matches opened windows with the stored ones and restores their geometry. By repeating this process with every stored application, the session management agent would restore the applications, their windows, and their content. Optionally, as a final step the windows z-order is restored to replicate mutual positions/order of all applications windows. Optionally, the windows are restored in the windows z-order sequence such that the deepest (furthest) window is opened first, and the top window(s) opened last.

Accordingly, it would be evident that embodiments of the invention may provide a user with a seamless experience of working with a mix of local application served from the client device and remote applications served from distributed remote servers.

Optionally, in embodiments of the invention where the session management agent and/or the session state description object(s) is not associated with a central gateway of a remote server and/or remote system then the central gateway is freed from maintaining the saved session(s) and a user can restore their work environment state independently from the remote server and/or remote system that hosted the remote session which is terminated and its session stored.

Within embodiments of the invention the session management agent executes in association with an initial remote session, the "source" session, to capture and transfer the session state description object(s) to a client application, which may be session management agent itself or another application (client application), which stores the session state description object(s) such that these can be subsequently employed to generate the new remote session, the "target" session, which receives, parses and restores the session state based on the session state description object(s) provided by the session management agent or client application.

Figure 4:
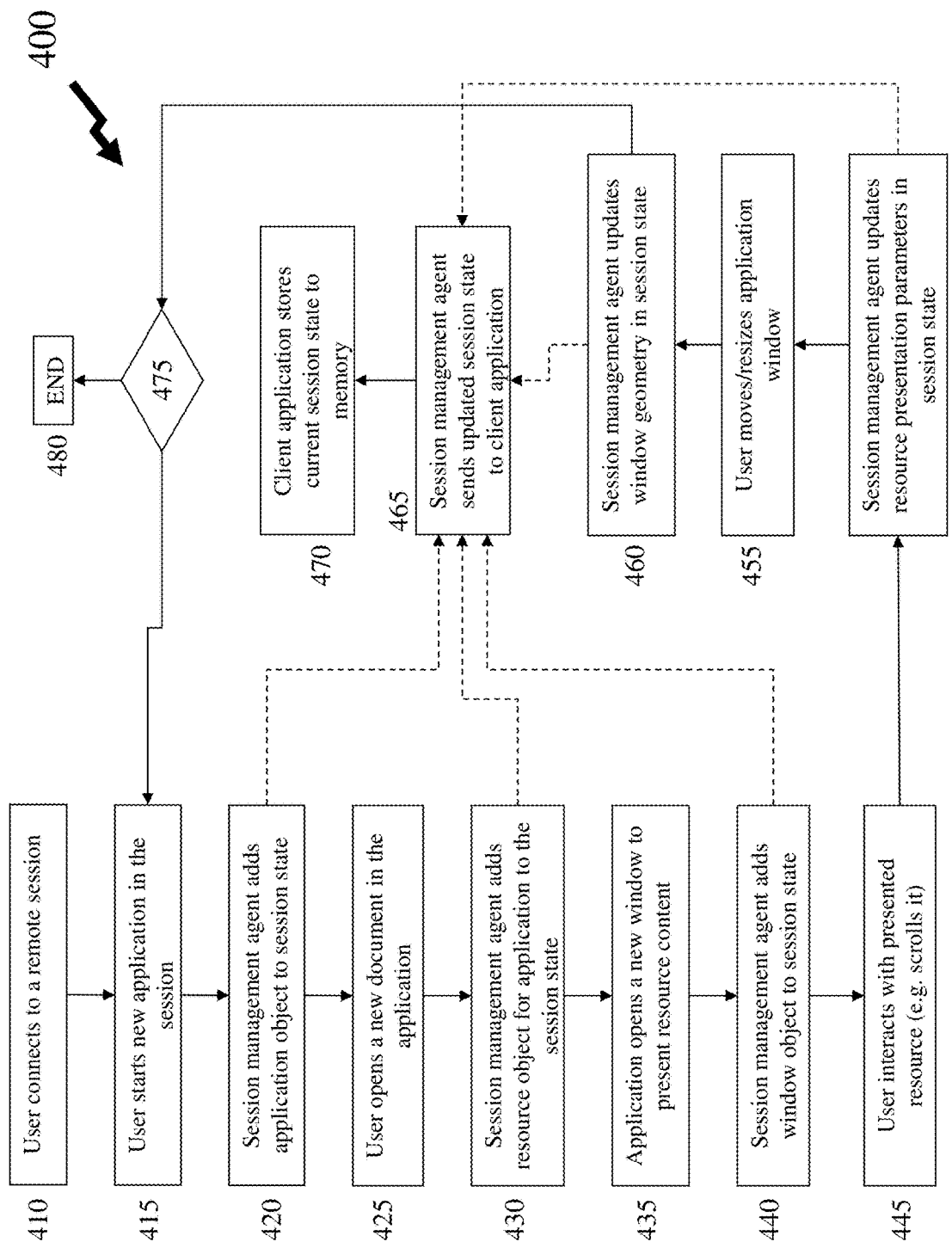
FIG. 4 depicts an exemplary flow chart for continuous session state updating and saving according to an embodiment of the invention.

Referring to FIG. 4 there is depicted an exemplary flow chart, Flow 400, for continuous session state updating and saving according to an embodiment of the invention. Flow 400 comprises first to fifteenth steps 410 to 470, respectively. First to eighth steps 410 to 445 comprising:

First step 410 wherein a user connects (establishes) a remote session;

Second step 415 wherein the user starts a new application;

Third step 420 wherein the session management agent adds a new application object to the session state, the application object identifying the new application started by the user in step 415, and links to twelfth step 465;

Fourth step 425 wherein the user opens a new document within the application;

Fifth step 430 wherein the session management agent adds a new resource object for the application to the session state, the resource object identifying the new document added by the user in fourth step 425, and links to twelfth step 465;

Sixth step 435 wherein the application opens a new window to present the resource content;

Seventh step 440 wherein the session management agent adds a new window object to the session state, the window object identifying the window opened in sixth step 435, and links to twelfth step 465; and Eighth step 445 wherein the user interacts with the presented resource content, e.g. scrolls through it.

From eighth step 445 the Flow 400 proceeds to ninth to eleventh steps 450 to 460 respectively, these comprising:

Ninth step 450 wherein the session management agent updates the session state with the resource presentation parameters;

Tenth step 455 wherein the user moves/resizes the application window; and

Eleventh step 460 wherein the session management agent updates the session state with the new window geometry, and links to twelfth step 465.

From eleventh step 460 the process of Flow 400 proceeds to fourteenth step 475 wherein a determination is made as to whether the current remote session is still active wherein a positive determination results in Flow 400 proceeding back to second step 415 and looping around iteratively capturing new windows, applications, documents, user actions, etc. If the determination is negative Flow 400 proceeds to fifteenth step 480 and ends.

In twelfth step 465 the session management agent sends updated session state to a client application wherein Flow 400 proceeds to thirteenth step 470 wherein the client application stores the current session state to memory. Optionally, the client application may be the client application providing the remote session or it may be another application storing the session state description objects(s) which the client application providing the remote session can access subsequently as described in Flow 500 in FIG. 5 to reinstate the application.

It would be evident that Flow 400 represents an exemplary flow for acquiring and storing the session state of a remote session. Within Flow 400 the process is described and depicted with respect to a user starting a new application etc. However, it would be evident that within other embodiments of the invention the session management agent tracks all user actions within a remote session. Accordingly, a session management agent may track actions of a user with respect to a new remote session or with respect to a reinstated remote session. Accordingly, within other embodiments of the invention the session management agent may be initiated with a new remote session and track all aspects of the user's actions within the remote session independent of any specific sequence of the user's actions unlike the specific sequence within Flow 400 of FIG. 4.

Figure 5:
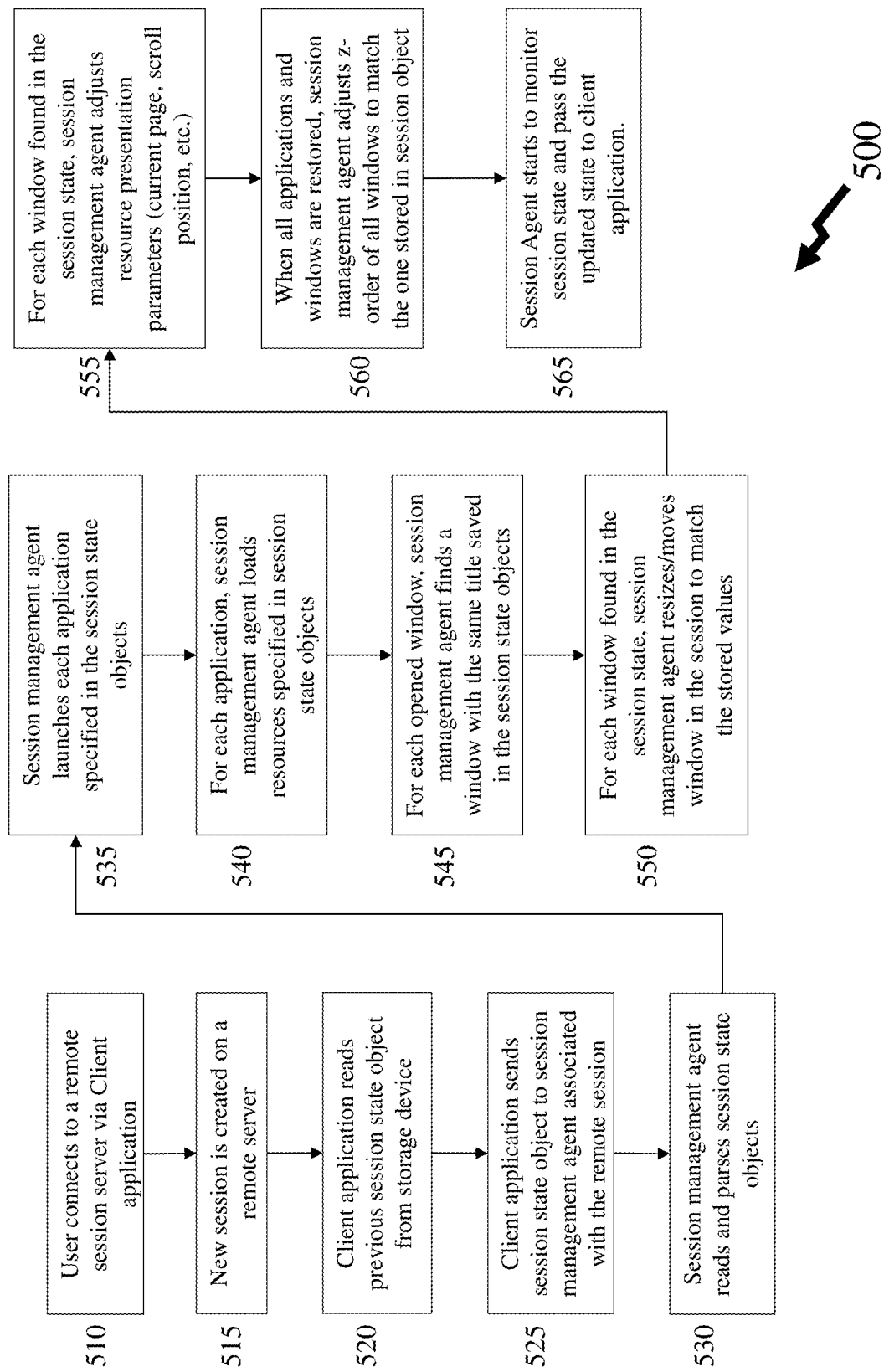
FIG. 5 depicts an exemplary flow chart for session state restoration according to an embodiment of the invention.

Now referring to FIG. 5 there is depicted an exemplary flow chart, Flow 500, for session state restoration according to an embodiment of the invention. As depicted Flow 500 comprises first to twelfth steps 510 to 565, respectively. As depicted first to sixth steps 510 to 535 comprise:

First step 510 wherein a user connects to a remote session server via a client application;

Second step 515 wherein a new session is created on a remote server for the user, this may be the same remote server upon which the original remote session was instantiated, or it may be another remote server;

Third step 520 wherein the client application reads the previous session state description objects (session state description object(s)) from a storage device;

Fourth step 525 wherein the client application sends the session state description objects (session state description object(s)) to a session management agent associated with the remote session;

Fifth step 530 wherein the session management agent reads and parses session state description object(s); and Sixth step 535 wherein the session management application launches each application specified within the session state description objects.

Optionally, the storage device from which the session state description object(s) are read in third step 520 may be associated with the client device with which the user establishes the initial and subsequent remote sessions.

Optionally, the storage device from which the session state description object(s) are read in third step 520 may be associated with a device associated with the user who establishes the initial and subsequent remote sessions which is either in communication with the client devices the user establishes the initial and subsequent remote sessions upon.

Optionally, the storage device from which the session state description object(s) are read in third step 520 may be associated with a remote server and/or remote system which instantiates the initial and subsequent remote sessions.

Optionally, the storage device from which the session state description object(s) are read in third step 520 may be a memory device which can be accessed by the remote server(s) and/or remote system(s) which instantiate the initial and subsequent remote sessions The session management agent in fourth step 525 may be an application upon a client device with which the user establishes the initial and subsequent remote sessions.

Optionally, the session management agent in fourth step 525 may be an application forming part of the software application with which the user establishes the initial and subsequent remote sessions.

Optionally, the session management agent in fourth step 525 may be an application upon a device associated with the user who establishes the initial and subsequent remote sessions which is either in communication with the client devices the user establishes the initial and subsequent remote sessions upon.

Optionally, the session management agent in fourth step 525 may be an application associated with a remote server and/or remote system which instantiates the initial and subsequent remote sessions.

Optionally, the session management agent in fourth step 525 may be an application which communicates with the remote server(s) and/or remote system(s) which instantiate the initial and subsequent remote sessions.

Referring to Flow 500 seventh to twelfth steps 540 to 565 comprise:
  Seventh step 540 wherein for each application the session management agent loads the resources specified within the session state description object(s);
  Eighth step 545 wherein for each opened window the session management agent identifies a window with the same title saved within the session state description object(s);
  Ninth step 550 wherein for each window within the session state the session management agent resize/moves the window in the session to match the stored values;
  Tenth step 555 wherein for each window found in the session state the session management agent adjusts the resource presentation parameters (current page, scroll position, etc.)
  Eleventh step 560 wherein when all applications and windows are restored the session management agent adjusts the z-order of all windows to match the one stored in session object; and
  Twelfth step 565 wherein the session management agent starts to monitor the remote session state and passes the updated state information to the client application.

Accordingly, from twelfth step 565 within Flow 500 the session management agent executes a monitoring process. Such a monitoring process may, for example, be such as described and depicted in respect of Flow 400 in FIG. 4.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    establishing a remote session upon a remote system;
    establishing a session management agent upon a computer system in association with the remote session;
    acquiring remote session data relating to the remote session;
    converting the remote session data, with the session management agent, to session state description objects;
    storing the session state description objects within a memory accessible to the session management agent as a remote session configuration; wherein
    the session management agent installs event filters via an application programming interface within a software application providing the remote session upon the computer system with the remote system, each event filter causing execution of specific code established in dependence a specific event occurring associated with the event filter.

2. The method according to claim 1, further comprising establishing another remote session upon another remote system;
    establishing a stored remote system configuration of a plurality of stored remote session configurations within a client application in execution upon another computer system where the remote system configuration is one of the plurality of stored remote session configurations;
    retrieving session state description objects from the stored remote system configuration of the plurality of stored remote session configurations from another memory of a plurality of memories where the memory is one of the plurality of memories; and
    sending the retrieved session state description objects to another session management agent upon the another computer systems;
    reading and parsing the retrieved session state description objects; wherein the another session management agent:
    launches each application specified within the parsed retrieved session state description objects within a new window opened with a graphical user interface rendered upon the another computer system;
    loads those resources specified within the parsed retrieved session state description objects for each launched application;
    identifies for each new window opened a window with a same title as the new window opened within the parsed retrieved session state description objects;
    at least one of resizes and moves each new window opened to match stored values of at least one of dimensions and locations of the window with the same title within the parsed retrieved session state description objects;
    adjusts for each new window opened one or more resource presentation parameters in dependence upon resource presentation parameters for the resource associated with the application launched with that new window opened within the parsed retrieved session state description objects; and adjusts the z-order of the new windows opened to that specified within the parsed retrieved session state description objects.

3. The method according to claim 1, wherein a first subset of the session state description objects defines windows open within the remote session, an order of the windows with a graphical user interface of the remote session, and a state of each window of the windows where the state of each window defines at least one of one of location with the graphical user interface of the remote session and a geometry;

a second subset of the session state description objects define running applications, each running application of the running applications associated with a window of the windows;

a third subset of the session state description objects define:

a list of resources associated with a session state defined by the session state description objects, each resource selected from the group comprising memory usage, central processor loading and graphical user loading;

a listed of loaded resources associated with the running applications; and resource presentation parameters of each loaded resource of the loaded resources, each presentation parameter selected from the group comprising a page number, a scroll position, and a time position when the resource is an item of audiovisual content.

4. The method according to claim 1, further comprising establishing another remote session upon another remote system; and automatically reinstating the remote session as the another remote system in dependence upon identification data transmitted to the session management agent upon establishment of the another remote system; wherein the identification data comprises:

the identity of a client device which at least one of the remote session was initiated from and the another remote session is being initiated from; and reinstating the remote session configuration comprises:

retrieving the session state description objects of the remote session configuration from the memory;

converting the session state description objects of the remote session configuration with the session management agent; and configuring the another remote session in dependence upon the converted session state description objects.

5. The method according to claim 1, wherein the session state description objects comprise a session state of the remote session;

the session state description objects define:

a list of computer resources associated with the session state selected from the group comprising memory usage, central processor loading and graphical user loading;

a list of running applications in execution within the remote session where each running application of the list of running applications is associated with a window of a plurality of windows rendered within a graphical user interface upon the computing device; and a z-order of the plurality of windows.

6. The method according to claim 1, wherein the session state description objects comprise a session state of the remote session;

the session state description objects define:

a list of computer resources associated with the session state selected from the group comprising memory usage, central processor loading and graphical user loading;

a list of running applications in execution within the remote session where each running application of the list of running applications is associated with a window of a plurality of windows rendered within a graphical user interface upon the computing device;

a z-order of the plurality of windows; and a state of each running application of the list of running applications comprising a unique application identity, a resource loaded by the running application of the list of running applications, and a status of the running application of the list of running applications; and the status of the running application of the list of running applications relates to whether at least one of a pop-up window is active and a drop-down menu is active.

7. The method according to claim 1, wherein the session state description objects comprise a session state of the remote session;

the session state description objects define:

a list of computer resources associated with the session state selected from the group comprising memory usage, central processor loading and graphical user loading;

a list of running applications in execution within the remote session where each running application of the list of running applications is associated with a window of a plurality of windows rendered within a graphical user interface upon the computing device;

a z-order of the plurality of windows; and a state of each window of the plurality of windows; and the state of each window of the plurality of windows defines a window identifier, a window title, a set of dimensions of the window of the plurality of windows, a geometry of the window of the plurality of windows, and a set of coordinates for the window of the plurality of windows which define a position of the window of the plurality of windows within the graphical user interface.

8. The method according to claim 1, wherein the session state description objects comprise a session state of the remote session;

the session state description objects define:

a list of computer resources associated with the session state selected from the group comprising memory usage, central processor loading and graphical user loading;

a list of running applications in execution within the remote session where each running application of the list of running applications is associated with a window of a plurality of windows rendered within a graphical user interface upon the computing device;

a z-order of the plurality of windows;

a state of each running application of the list of running applications comprising a unique application identity, a resource loaded by the running application of the list of running applications, and a status of the running application of the list of running applications; and a state of each window of the plurality of windows;

the state of each window of the plurality of windows defines a window identifier, a window title, a set of dimensions of the window of the plurality of windows, a geometry of the window of the plurality of windows, and a set of coordinates for the window of the plurality of windows which define a position of the window of the plurality of windows within the graphical user interface; and the status of the running application of the list of running applications relates to whether at least one of a pop-up window is active and a drop-down menu is active.

9. The method according to claim 1, wherein the session state description objects comprise a session state of the remote session;

the session state description objects define:

a list of computer resources associated with the session state selected from the group comprising memory usage, central processor loading and graphical user loading;

a list of running applications in execution within the remote session where each running application of the list of running applications is associated with a window of a plurality of windows rendered within a graphical user interface upon the computing device;

a z-order of the plurality of windows; and a state of each running application of the list of running applications comprising a unique application identity, a resource loaded by the running application of the list of running applications, a status of the resource loaded by the running application of the list of running applications and a status of the running application of the list of running applications;

the status of the running application of the list of running applications relates to whether at least one of a pop-up window is active and a drop-down menu is active; and a status of the resource loaded by the running application of the list of running applications is selected from a page number, a scroll position, and a time position when the resource is an item of audiovisual content.

10. The method according to claim 1, further comprising establishing another remote session upon another remote system;

establishing a stored remote system configuration of a plurality of stored remote session configurations within a client application in execution upon another computer system where the remote system configuration is one of the plurality of stored remote session configurations;

retrieving session state description objects from the stored remote system configuration of the plurality of stored remote session configurations from another memory of a plurality of memories where the memory is one of the plurality of memories; and sending the retrieved session state description objects to another session management agent upon the another computer systems;

reading and parsing the retrieved session state description objects; wherein the another session management agent:

launches each application specified within the parsed retrieved session state description objects within a new window opened with a graphical user interface rendered upon the another computer system;

loads those resources specified within the parsed retrieved session state description objects for each launched application;

identifies for each new window opened a window with a same title as the new window opened within the parsed retrieved session state description objects;

at least one of resizes and moves each new window opened to match stored values of at least one of dimensions and locations of the window with the same title within the parsed retrieved session state description objects;

adjusts for each new window opened one or more resource presentation parameters in dependence upon resource presentation parameters for the resource associated with the application launched with that new window opened within the parsed retrieved session state description objects;

adjusts the z-order of the new windows opened to that specified within the parsed retrieved session state description objects;

acquires further remote session data relating to the another remote session;

converts the further remote session data, with the another session management agent, to further session state description objects; and updates the stored the session state description objects in dependence upon the further session state description objects; and the another session management agent installs event filters via an application programming interface within a software application providing the remote session upon the computer system with the remote system, each event filter causing execution of specific code established in dependence a specific event occurring associated with the event filter.

11. The method according to claim 1, further comprising establishing another remote session upon another remote system;

rendering to a user of the another remote system a list of stored sessions, each stored session of the list of stored sessions comprising session state description objects established for a previous remote session upon at least one of the remote system, the another remote system or a further remote system;

receiving an indication of a selected stored session of the plurality of stored sessions from a user of another computer system associated with the another remote session;

establishing a stored remote system configuration within a client application in execution upon another computer system where the remote system configuration comprises the stored session state description objects associated with the selected stored session of the plurality of stored sessions;

retrieving the stored session state description objects from the stored remote system configuration from another memory of a plurality of memories where the memory is one of the plurality of memories; and sending the retrieved session state description objects to another session management agent upon the another computer systems;

reading and parsing the retrieved session state description objects; wherein the another session management agent:

launches each application specified within the parsed retrieved session state description objects within a new window opened with a graphical user interface rendered upon the another computer system;

loads those resources specified within the parsed retrieved session state description objects for each launched application;

identifies for each new window opened a window with a same title as the new window opened within the parsed retrieved session state description objects;

at least one of resizes and moves each new window opened to match stored values of at least one of dimensions and locations of the window with the same title within the parsed retrieved session state description objects;

adjusts for each new window opened one or more resource presentation parameters in dependence upon resource presentation parameters for the resource associated with the application launched with that new window opened within the parsed retrieved session state description objects;

adjusts the z-order of the new windows opened to that specified within the parsed retrieved session state description objects;

acquires further remote session data relating to the another remote session;

converts the further remote session data, with the another session management agent, to further session state description objects; and updates the stored the session state description objects in dependence upon the further session state description objects; and the another session management agent installs event filters via an application programming interface within a software application providing the remote session upon the computer system with the remote system, each event filter causing execution of specific code established in dependence a specific event occurring associated with the event filter.

12. The method according to claim 1, further comprising establishing another remote session upon another remote system;

rendering to a user of the another remote system a list of stored sessions, each stored session of the list of stored sessions comprising session state description objects established for a previous remote session upon at least one of the remote system, the another remote system or a further remote system;

receiving an indication of a selected stored session of the plurality of stored sessions from a user of another computer system associated with the another remote session;

establishing a stored remote system configuration within a client application in execution upon another computer system where the remote system configuration comprises the stored session state description objects associated with the selected stored session of the plurality of stored sessions;

retrieving the stored session state description objects from the stored remote system configuration from another memory of a plurality of memories where the memory is one of the plurality of memories; and sending the retrieved session state description objects to another session management agent upon the another computer systems;

reading and parsing the retrieved session state description objects; wherein the another session management agent:

launches each application specified within the parsed retrieved session state description objects within a new window opened with a graphical user interface rendered upon the another computer system;

loads those resources specified within the parsed retrieved session state description objects for each launched application;

identifies for each new window opened a window with a same title as the new window opened within the parsed retrieved session state description objects;

at least one of resizes and moves each new window opened to match stored values of at least one of dimensions and locations of the window with the same title within the parsed retrieved session state description objects;

adjusts for each new window opened one or more resource presentation parameters in dependence upon resource presentation parameters for the resource associated with the application launched with that new window opened within the parsed retrieved session state description objects;

adjusts the z-order of the new windows opened to that specified within the parsed retrieved session state description objects;

acquires further remote session data relating to the another remote session;

converts the further remote session data, with the another session management agent, to further session state description objects; and updates the stored the session state description objects in dependence upon the further session state description objects;

the another session management agent installs event filters via an application programming interface within a software application providing the remote session upon the computer system with the remote system, each event filter causing execution of specific code established in dependence a specific event occurring associated with the event filter; and each stored session of the list of stored sessions is associated with a different activity of the user.

13. The method according to claim 1, further comprising establishing another remote session upon another remote system;

rendering to a user of the another remote system a list of stored sessions, each stored session of the list of stored sessions comprising session state description objects established for a previous remote session upon at least one of the remote system, the another remote system or a further remote system;

receiving an indication of a selected stored session of the plurality of stored sessions from a user of another computer system associated with the another remote session;

establishing a stored remote system configuration within a client application in execution upon another computer system where the remote system configuration comprises the stored session state description objects associated with the selected stored session of the plurality of stored sessions;

retrieving the stored session state description objects from the stored remote system configuration from another memory of a plurality of memories where the memory is one of the plurality of memories; and sending the retrieved session state description objects to another session management agent upon the another computer systems;
reading and parsing the retrieved session state description objects; wherein
the another session management agent:
  launches each application specified within the parsed retrieved session state description objects within a new window opened with a graphical user interface rendered upon the another computer system;
  loads those resources specified within the parsed retrieved session state description objects for each launched application;
  identifies for each new window opened a window with a same title as the new window opened within the parsed retrieved session state description objects;
  at least one of resizes and moves each new window opened to match stored values of at least one of dimensions and locations of the window with the same title within the parsed retrieved session state description objects;
  adjusts for each new window opened one or more resource presentation parameters in dependence upon resource presentation parameters for the resource associated with the application launched with that new window opened within the parsed retrieved session state description objects;
  adjusts the z-order of the new windows opened to that specified within the parsed retrieved session state description objects;
  acquires further remote session data relating to the another remote session;
  converts the further remote session data, with the another session management agent, to further session state description objects; and
  updates the stored the session state description objects in dependence upon the further session state description objects;
the another session management agent installs event filters via an application programming interface within a software application providing the remote session upon the computer system with the remote system, each event filter causing execution of specific code established in dependence a specific event occurring associated with the event filter; and
each stored session of the list of stored sessions is associated with a different activity of the user selected from the group comprising computer aided design, computer aided modelling, graphical design, viewing audiovisual content, and working with an office application.

14. The method according to claim 1, further comprising
establishing another remote session upon another remote system;
rendering to a user of the another remote system a list of stored sessions, each stored session of the list of stored sessions comprising session state description objects established for a previous remote session upon at least one of the remote system, the another remote system or a further remote system;
receiving an indication of a selected stored session of the plurality of stored sessions from a user of another computer system associated with the another remote session;
establishing a stored remote system configuration within a client application in execution upon another computer system where the remote system configuration comprises the stored session state description objects associated with the selected stored session of the plurality of stored sessions;
retrieving the stored session state description objects from the stored remote system configuration from another memory of a plurality of memories where the memory is one of the plurality of memories; and
sending the retrieved session state description objects to another session management agent upon the another computer systems;
reading and parsing the retrieved session state description objects; wherein
parsing the retrieved session state description objects restores opened resource contexts for each opened resource within the remote session;
each opened resource is associated with an application in execution upon the remote system and a window of a graphical user interface of the computer system; and
restoring the opened resource context comprises either navigating to a stored page of an item of electronic content or scrolling a canvas to a defined portion of another item of content where the stored page of the item of electronic content or defined portion of another item of content were those when the remote session upon the remote system was at least one of paused, transferred, and terminated.

\* \* \* \* \*